United States Patent [19]

Dufft

[11] 4,418,534
[45] Dec. 6, 1983

[54] HYDRAULIC PRESSURE MASTER CYLINDER

[75] Inventor: Jurgen Dufft, Kennilworth, England

[73] Assignee: Lucas Industries Limited, Birmingham, England

[21] Appl. No.: 242,261

[22] Filed: Mar. 10, 1981

[30] Foreign Application Priority Data

Mar. 18, 1980 [GB] United Kingdom ............... 8009049

[51] Int. Cl.³ .............................................. B60T 11/26
[52] U.S. Cl. .................................................. 60/585
[58] Field of Search ................................. 60/585, 592

[56] References Cited

U.S. PATENT DOCUMENTS

| 1,945,728 | 2/1934 | Brush | 60/585 |
| 4,200,163 | 4/1980 | Bass | 60/592 |
| 4,294,072 | 10/1981 | Flynn | 60/592 |
| 4,295,336 | 10/1981 | Falk | 60/592 |

FOREIGN PATENT DOCUMENTS

| 1246439 | 8/1967 | Fed. Rep. of Germany | 60/585 |
| 1403376 | 8/1975 | United Kingdom | 60/585 |

Primary Examiner—Abraham Hershkovitz
Attorney, Agent, or Firm—Holman & Stern

[57] ABSTRACT

An hydraulic pressure master cylinder has a cylinder usually of metal, and a separately made plastics reservoir. The reservoir is retained on the cylinder by means of a pair of resilient arms, the internal faces of which are recessed to conform the external surface of the cylinder. The reservoir is fitted to the cylinder by deforming the arms outwardly to enable them to shap-engage around the cylinder so that the latter seats within the recesses. If desired, the free end portions of the arms may be joined by a fixing device such as a rivet.

3 Claims, 2 Drawing Figures

HYDRAULIC PRESSURE MASTER CYLINDER

BACKGROUND OF THE INVENTION

This invention relates to a hydraulic pressure master cylinder for use in a hydraulic pressure system and primarily for use in the hydraulic brake or clutch actuating system or a motor vehicle. The invention is concerned with such a master cylinder of the fabricated type in which a reservoir, of moulded plastics material for example, and a cylinder of metal for example, are separately made and secured together to form a complete master cylinder.

DESCRIPTION OF THE PRIOR ART

In some conventional fabricated master cylinders, a threaded spigot projects from the underside of the reservoir and is received in a threaded hole formed in a boss projecting from the upper surface of the cylinder, in order to secure the reservoir and cylinder together. This type of arrangement necessitates expensive machining operations on at least the cylinder, and the spigot and boss connection tends to increase the overall height of the master cylinder as compared, for example, with some master cylinders in which the reservoir and cylinder are integrally formed. Since a master cylinder is usually installed in the vehicle engine compartment, often in cramped conditions, such an increase in height can be disadvantageous.

BRIEF SUMMARY OF THE INVENTION

An object of the invention is to provide a fabricated master cylinder in which the reservoir and cylinder are secured together in a simple and effective manner, which, as compared with some conventional fabricated master cylinders, leads to economy of manufacture and also to a reduction in overall height of the assembly.

According to the invention, a master cylinder comprises a cylinder and separately made reservoir mounted thereon, the reservoir and cylinder being adapted respectively to permit the passage therebetween, in use, of hydraulic fluid, the reservoir having projecting arms arranged to engage the external cylinder wall at opposite sides of the cylinder and acting to retain the reservoir and cylinder in cooperative relationship.

The cylinder-engaging faces of the arms may conveniently be shaped to follow the shape of the external cylinder wall which they engage. In one preferred arrangement, one or more pairs of arms are provided, and the arms of each pair are aligned transversely of the cylinder. The shaping of the faces may be achieved by forming recesses of appropriate shape therein and it can then be advantageous for the arms to be resilient, enabling them to be displaced outwardly by insertion of the cylinder between them until the cylinder engages within the recesses by snap-engagement.

Preferably, the arms, when transversely aligned, extend beyond the external periphery of the cylinder and are secured together by fixing means acting between their free end portions.

The reservoir is preferably formed with a projecting spigot which extends into an opening in the cylinder wall, thereby to resist displacement of the reservoir longitudinally of the cylinder. The spigot may conveniently be hollow and arranged to provide a fluid flow path between the respective interiors of the reservoir and cylinder through said cylinder wall opening.

BRIEF DESCRIPTION OF THE DRAWINGS

The invention will now be described, by way of example, with reference to the accompanying drawngs, in which.

DETAILED DESCRIPTION

Figure 1:
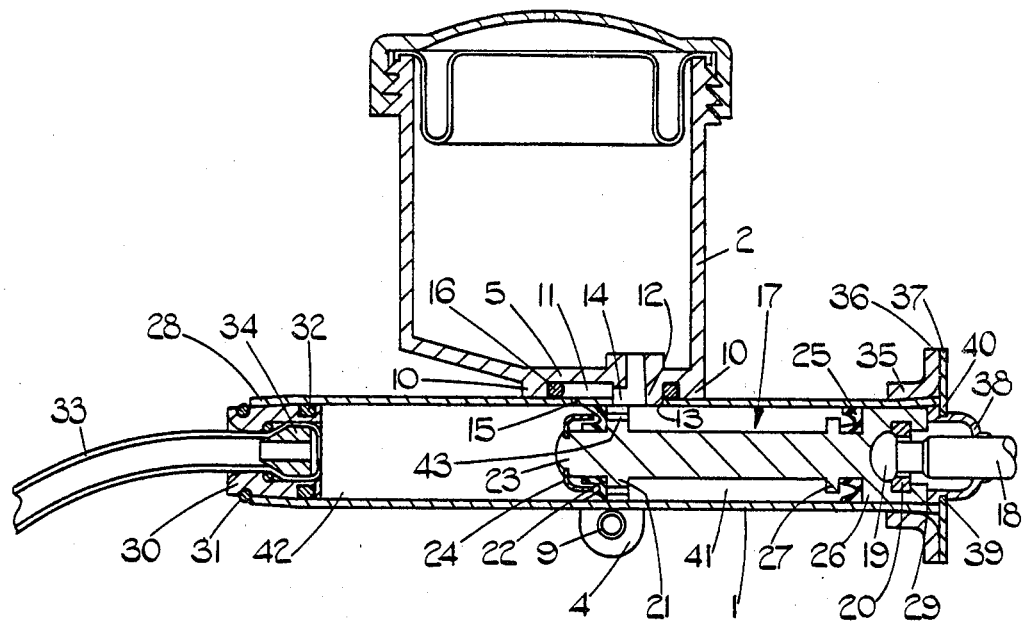
FIG. 1 is a longitudinal cross-sectional view of one form of the master cylinder of the invention.
Figure 2:
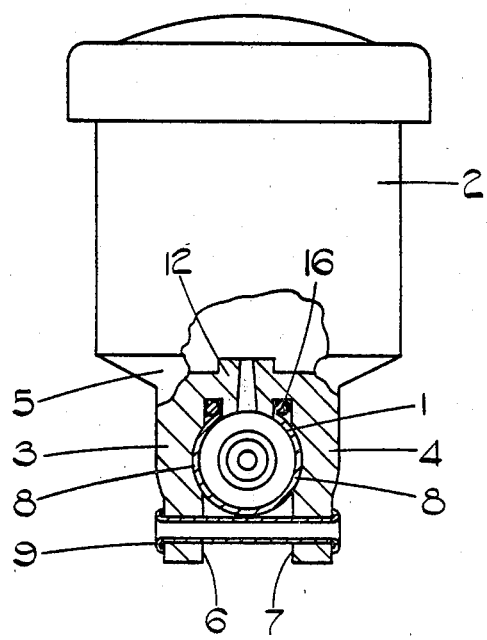
FIG. 2 is an end view, partly in transverse cross-section, of the master cylinder of FIG. 1.

Referring to the drawings, these show a master cylinder for use in a vehicle hydraulic clutch-actuating system. The master cylinder comprises a cylinder 1 in the form of a metal tube and separately made reservoir 2, of moulded plastics material mounted thereon. The reservoir is retained on the cylinder by means of a pair of resilient arms 3, 4 which project in opposed relationship from the base 5 of the reservoir. The spacing between the opposed surfaces 6, 7 of the arms is rather less than the external diameter of the cylinder 1 and these internal surfaces are provided with respective arcuate recesses 8 having the same curvature as the external cylinder wall. The arms are sufficiently resilient to enable them to be resiliently deformed outwardly, and the reservoir is mounted on the cylinder by inserting the latter between the free end portions of the arms and applying force to urge the cylinder towards the base 5 of the reservoir until the cylinder reaches the recesses 8, whereupon the arms resiliently recover to snap-engage the cylinder into the recesses and thus retain the reservoir on the cylinder. Additional security is provided by making the arms sufficiently long to project beyond the periphery of the cylinder and securing the projecting end portions together by the passage therethrough of a fixing device shown as a rivet 9. The fixing device may also act to squeeze the arms together and so increase the retention force.

The base 5 of the reservoir has a downwardly projecting flange 10 defining a chamber 11 in the general form of a rectangle of which the short sides, disposed longitudinally of the cylinder are outwardly curved. A hollow spigot 12 extends from the interior of the reservoir into the chamber 11 and extends beyond the outer extremity of the flange 10 by a distance which is slightly less than the thickness of the cylinder wall. The diameter of the spigot 12 is such that it fits closely within an opening 13 through the cylinder wall and acts to resist displacement of the reservoir longitudinally of the cylinder. The degree of extension referred to above of the spigot beyond the flange 10 ensures that the spigot does not form an obstruction within the cylinder. The spigot 12 and opening 13 also provide a first fluid path between the reservoir and cylinder. A transverse passage 14 in the spigot provides a communication between the reservoir and chamber 11 and a second fluid path is established between the reservoir and cylinder through the chamber 11 via an opening 15 in the cylinder wall portion underlying the chamber. A resilient sealing ring 16 conforms to the peripheral shape of the chamber 11 and provides a fluid-tight seal between the chamber and the external wall of the cylinder.

A piston assembly, generally designated 17, is slidably reciprocable within the cylinder 1 under the control of a driver-operated clutch pedal (not shown) connected to the piston assembly by means of a rod 18